United States Patent
Ota et al.

(10) Patent No.: US 11,884,995 B2
(45) Date of Patent: Jan. 30, 2024

(54) CO-BASED ALLOY MATERIAL, CO-BASED ALLOY PRODUCT, AND METHOD FOR MANUFACTURING SAID PRODUCT

(71) Applicant: MITSUBISHI HEAVY INDUSTRIES, LTD., Tokyo (JP)

(72) Inventors: Atsuo Ota, Tokyo (JP); Shinya Imano, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/898,986

(22) Filed: Aug. 30, 2022

(65) Prior Publication Data
US 2023/0070692 A1 Mar. 9, 2023

(30) Foreign Application Priority Data
Sep. 1, 2021 (JP) .................. 2021-142631

(51) Int. Cl.
*C22C 19/07* (2006.01)
*B33Y 10/00* (2015.01)
(Continued)

(52) U.S. Cl.
CPC .............. *C22C 19/07* (2013.01); *B22F 10/28* (2021.01); *B22F 10/64* (2021.01); *B33Y 10/00* (2014.12);
(Continued)

(58) Field of Classification Search
None
See application file for complete search history.

(56) References Cited

U.S. PATENT DOCUMENTS

| 10,632,535 B2 | 4/2020 | Imano et al. |
| 2008/0185078 A1 | 8/2008 | Ishida et al. |
(Continued)

FOREIGN PATENT DOCUMENTS

| CN | 102816965 B | 11/2016 |
| CN | 108411163 A | 8/2018 |
(Continued)

OTHER PUBLICATIONS

Extended European Search Report dated Jan. 25, 2023, issued in counterpart EP Application No. 22189907.3. (7 pages).
(Continued)

*Primary Examiner* — Anthony M Liang
(74) *Attorney, Agent, or Firm* — WHDA, LLP

(57) ABSTRACT

There is provided a Co-based alloy material, having a chemical composition including: Al of 0.1 to 10 mass %; W of 3 to 45 mass %, the total content of Al and W being 50 mass % or less; O of 0.007 to 0.05 mass %; and the balance being Co and impurities, wherein in γ phase crystal grains as a matrix phase of the Co-based alloy material, segregation cells within an average size of 0.15 to 1.5 μm are formed, wherein in the segregation cells, γ' phase grains within a size of 0.01 to 0.5 μm including Co, Al and W are dispersively precipitated, and wherein on boundary regions of the segregation cells and grain boundaries of the γ phase crystal grains, μ phase grains within a size of 0.005 to 2 μm including Co and W are dispersively precipitated.

7 Claims, 5 Drawing Sheets

(51) Int. Cl.
*B33Y 70/00* (2020.01)
*B33Y 40/20* (2020.01)
*B22F 10/28* (2021.01)
*B22F 10/64* (2021.01)
*C22F 1/10* (2006.01)

(52) U.S. Cl.
CPC .............. *B33Y 40/20* (2020.01); *B33Y 70/00* (2014.12); *C22F 1/10* (2013.01); *B22F 2301/15* (2013.01)

(56) References Cited

U.S. PATENT DOCUMENTS

| | | | |
|---|---|---|---|
| 2012/0312434 A1* | 12/2012 | Suzuki | .................. C22C 19/057 420/588 |
| 2019/0203323 A1 | 7/2019 | Suzuki et al. | |
| 2021/0207255 A1 | 7/2021 | Dunand et al. | |
| 2021/0340645 A1 | 11/2021 | Wang et al. | |
| 2021/0404036 A1 | 12/2021 | Wang et al. | |

FOREIGN PATENT DOCUMENTS

| | | |
|---|---|---|
| CN | 112004951 A | 11/2020 |
| CN | 112004952 A | 11/2020 |
| JP | H0584592 A | 4/1993 |
| JP | 4996468 B2 | 8/2012 |
| WO | 2019/233692 A1 | 12/2019 |

OTHER PUBLICATIONS

Machine translation of Office Action dated May 31, 2023, issued in counterpart TW Application No. 111128591. (5 pages).
Office Action dated Aug. 1, 2023, issued in counterpart CN Application No. 202211045943.7, with English translation. (16 pages).
Office Action dated May 31, 2023, issued in counterpart TW Application No. 111128591. (3 pages).

* cited by examiner

Co-BASED ALLOY MATERIAL

Co-BASED ALLOY PRODUCT

CO-BASED ALLOY MATERIAL, CO-BASED ALLOY PRODUCT, AND METHOD FOR MANUFACTURING SAID PRODUCT

CLAIM OF PRIORITY

The present application claims priority from Japanese patent application serial no. 2021-142631 filed on Sep. 1, 2021, the content of which is hereby incorporated by reference into this application.

FIELD OF THE INVENTION

The present invention relates to a Co-based alloy material, a Co-base alloy product using said material, and a method for manufacturing said product.

DESCRIPTION OF RELATED ART

Co (cobalt) based alloy materials, along with Ni (nickel) based alloy ones, are representative heat resistant alloy materials. Also referred to as superalloys, they are widely utilized for members to be used under high temperature environment (so-called high temperature members). Although Co-based alloy materials are higher in material costs than Ni-based alloy ones, they have been used for applications such as turbine stator blades and combustor members because of their excellence in corrosion resistance and abrasion resistance, and their ease of solid solution strengthening. Thereby, Co-based alloy materials have been applied conventionally to turbine blades in such as gas turbines and steam turbines, combustor members and/or tools for friction stir welding.

With respect to such Co-based alloy materials, for example, a Co-based alloy described in JP 4996468 B2 is known. JP 4996468 B2 discloses a Co-based alloy having a composition of, in terms of mass proportion: 0.1 to 10% of Al, 3.0 to 45% of W both amounting to less than 50% in total content and Co as a remainder without indispensable impurities, and comprising a matrix phase (γ phase) with fcc structure of Co-base and a precipitation phase (γ' phase) precipitating within grains of the matrix phase, the precipitated phase being a $L1_2$-type intermetallic compound with fcc structure of $Co_3(Al,W)$ by atom ratio. JP 4996468 B2 also teaches that: the mismatch in the lattice constant between the matrix phase (γ phase) of the Co-based alloy and the precipitation phase (γ' phase) of $Co_3(Al,W)$ is 0.5% or less; the precipitation phase (γ' phase) of $Co_3(Al,W)$ has a grain diameter range of 50 nm to 1 μm and a precipitation amount range of 40 to 80 volume %; and a Vickers hardness at 800° C. of the Co-based alloy is 250 or more.

According to JP 4996468 B2, hot-rolled plates made of the Co-based alloy in which the γ' phase with appropriate grain diameters and appropriate amounts is precipitated in the γ phase exhibit superior mechanical properties (e.g., 0.2% proof stress, tensile strength, and Vickers hardness).

In the research by the present inventors, it has been confirmed that a Co-based alloy material having a two-phase structure consisting of a γ phase as a matrix phase and a precipitation strengthening phase (γ' phase, $L1_2$ structure) exhibits good mechanical properties as taught in JP 4996468 B2.

However, when the Co-based alloy material was prepared by melting and casting with an amount of an industrial production level, based on the manufacturing conditions taught by JP 4996468 B2, it was found that coarse grains of an undesired heterogeneous phase (e.g., p phase, a kind of topologically close packed (TCP) phases) were prone to be formed/precipitated. Furthermore, it was difficult to completely eliminate such undesired phase even through a solution treatment. Moreover, it has been confirmed that the Co-based alloy material in which such undesired phases are clearly existed/precipitated cannot exhibit good mechanical properties, as described also in JP 4996468 B2.

In other words, at the industrial production level, it is necessary to excise/remove the region where coarse grains of the undesired phases precipitate, and there is a problem that the production yield is prone to decrease (resulting an increase in the production cost).

SUMMARY OF THE INVENTION

The present invention was made in view of the foregoing and has an object to provide a Co-based alloy material having mechanical properties equal to or higher than those of the conventional one and capable of suppressing a decrease in the production yield as compared with the conventional one. Also, the invention has other objects to provide a Co-based alloy product using said material and a method for manufacturing said product.

(I) According to one aspect of the present invention, there is provided a Co-based alloy material. The Co-based alloy material has a chemical composition including: Al (aluminum) of 0.1 mass % or more and 10 mass % or less; W (tungsten) of 3 mass % or more and 45 mass % or less, the total content of the Al and the W being 50 mass % or less; O (oxygen) of 0.007 mass % or more and 0.05 mass % or less; and the balance being Co and impurities. In γ (gamma) phase crystal grains as a matrix phase of the Co-based alloy material, segregation cells within an average size of 0.15 μm or more and 1.5 μm or less are formed. In the segregation cells, γ' (gamma prime) phase grains within a size of 0.01 μm or more and 0.5 μm or less including the Co, the Al and the W are dispersively precipitated. On boundary regions of the segregation cells and grain boundaries of the γ phase crystal grains, μ (mu) phase grains within a size of 0.005 μm or more and 2 μm or less including the Co and the W are dispersively precipitated.

In the present invention, sizes of the γ phase crystal grains, the γ' phase grains, the μ phase grains and the segregation cells are measured by image analysis with an image processing program (ImageJ, a public domain program developed at the National Institutes of Health (NIH) in U.S.A.) to microstructure observation images thereof. ImageJ approximates a shape of the measurement target to a circle, ellipse, rectangle, etc., and calculates the size thereof. In the invention, after performing shape approximation for each measurement target in the microstructure observation image, the maximum and minimum lengths of the measurement target are measured, and the average value thereof is regarded as the size of the measurement target. Furthermore, the average size is a value obtained by averaging the sizes of about 50 measurement targets in one observation image.

In the above Co-based alloy material (I) of the invention, the following changes and modifications can be made.

(i) The material may be a powder comprising particles; the particles may have a size of 0.3 μm or more and 90 μm or less; and the γ phase crystal grains constituting the powder particles may have an average size of 50 μm or less.

(ii) The material may be a powder comprising particles; the particles may have a size of 0.3 μm or more and 90 μm or less in an amount of 90 mass % or more thereof; and the γ phase crystal grains constituting the powder particles may have an average size of 50 μm or less.

(iii) When a hole flow testing is performed in accordance with JIS Z 2502: 2012 for 50 g of the powder classified into a size range of 15 μm or more and 45 μm or less, fluidity of the powder classified may be 15 seconds or more and 30 seconds or less.

In the invention, the particle size of the powder is measured by using a laser diffraction/scattering type particle size distribution measuring apparatus or the like.

(II) According to another aspect of the invention, there is provided a Co-based alloy product. The Co-based alloy product has a chemical composition including: Al of 0.1 mass % or more and 10 mass % or less; W of 3 mass % or more and 45 mass % or less, the total content of the Al and the W being 50 mass % or less; O of 0.007 mass % or more and 0.05 mass % or less; and the balance being Co and impurities. The Co-based alloy product is a polycrystalline body of γ phase crystal grains having an average size of 10 μm or more and 100 μm or less. In the γ phase crystal grains, γ' phase grains within a size of 0.01 μm or more and 1 μm or less including the Co, the Al and the W are dispersively precipitated in an amount of 40 volume % or more and 85 volume % or less. In the γ phase crystal grains and on grain boundaries thereof, μ phase grains within a size of 0.005 μm or more and 20 μm or less including the Co and the W are dispersively precipitated at an average intergrain distance of 0.15 μm or more and 100 μm or less.

In the invention, the average intergrain distance of phase is determined, using the image processing software to a microstructure observation image, by searching for adjacent μ phase grains radially from the center of gravity position of a μ phase grain of interest and averaging the distance between the centers of gravity of the adjacent μ phase grains.

In the above Co-based alloy material (I) and the above Co-based alloy product (II) of the invention, the following changes and modifications can be made.

(iv) The chemical composition may further comprise: E1 component that is at least one selected from B (boron), C (carbon), Y (yttrium), La (lanthanum) and mischmetal, the total content of the E1 component being 0.001 mass % or more and 2 mass % or less; and E2 component that is at least one selected from Cr (chromium), Fe (iron), Ni (nickel), Mo (molybdenum), Ru (ruthenium), Re (rhenium), Ir (iridium), Ti (titanium), Zr (zirconium), Hf (hafnium), V (vanadium), Nb (niobium) and Ta (tantalum), the total content of the E2 component being 0.1 mass % or more and 50 mass % or less.

(v) The chemical composition may consist of: C of 0.05 mass % or more and 0.15 mass % or less; O of 0.007 mass % or more and 0.05 mass % or less; Al of 2 mass % or more and 5 mass % or less; W of 7 mass % or more and 25 mass % or less; Cr of 6 mass % or more and 10 mass % or less; Ni of 20 mass % or more and 35 mass % or less; Ta of 3 mass % or more and 8 mass % or less; and the balance being Co and impurities.

(III) According to still another aspect of the invention, there is provided a method for manufacturing the Co-based alloy product. The method comprises: an alloy powder preparation step of preparing a Co-based alloy powder having the chemical composition; an additive manufacturing step of forming an additively manufactured article using the Co-based alloy powder; and an aging treatment step of subjecting the additively manufactured article to a heat treatment at temperatures ranging from 500 to less than 1100° C.

In the above method for manufacturing the Co-based alloy product (III) of the invention, the following changes and modifications can be made.

(vi) The alloy powder preparation step may comprise an alloy powder classification substep, and powder classified through the substep may comprise particles within a range of 0.3 μm or more and 90 μm or less in an amount of 90 mass % or more thereof.

Advantages of the Invention

According to the present invention, there can be provided a Co-based alloy material having mechanical properties comparable to or superior to those of the conventional one and capable of suppressing a decrease in the production yield as compared with the conventional one. In addition, there can be provided a Co-based alloy product using said material and a method for manufacturing said product.

DETAILED DESCRIPTION OF THE PREFERRED EMBODIMENTS

[Basic Concept of the Invention]

Figure 1:
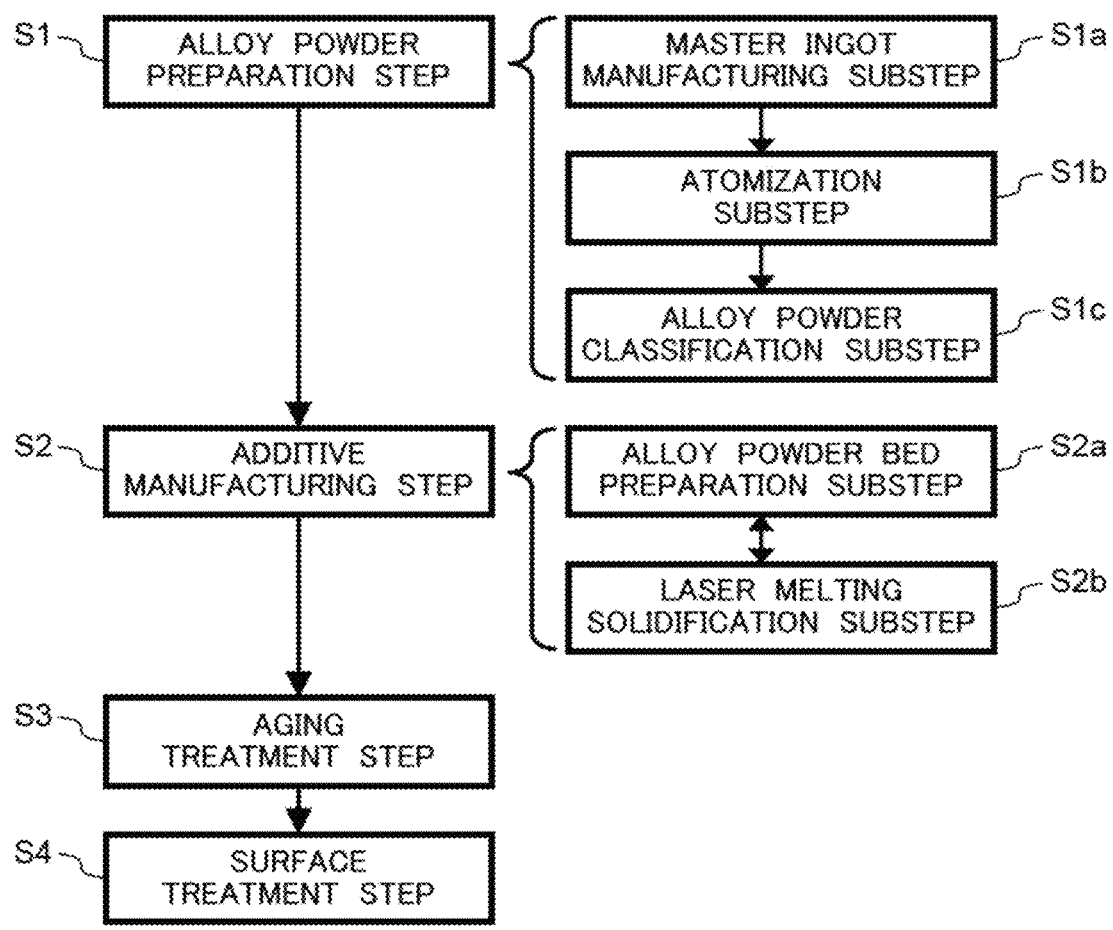
FIG. 1 is a flow diagram showing an exemplary process of a method for manufacturing a Co-based alloy product according to an embodiment of the present invention.

In general, Co-based alloy materials have features in that the melting points thereof are higher by about 50 to 100° C. than those of Ni-based alloy materials and microstructural changes during using at high temperatures are less than those of Ni-based alloy materials because of smaller diffusion coefficients of substitutional elements in Co-based alloy materials than in Ni-based alloy materials. In addition, Co-based alloy materials have higher ductility than Ni-based alloy materials, so that it is easy to perform plastic working such as forging, rolling, and pressing. Further, Co-based alloy materials usually have elastic moduli of about 220-230 GPa, which are more than 10% higher than those of Ni-based alloy materials of about 200 GPa. Because of these features, Co-based alloy materials are expected to be used in a wider range of applications than Ni-based alloy materials.

For example, a Co-based alloy material can be used not only for high-temperature members but also for applications requiring high mechanical strength and high elasticity such as springs (e.g., spiral and coil), wires, belts, and cable guides. Further, a Co-based alloy material is suitable as an overlay/build-up material since it is hard and has excellent wear resistance and corrosion resistance.

In the Co-based alloy materials, $Co_3Ti$ phase, $Co_3Ta$ phase, $Co_3(Al,W)$ phase and the like are known as precipitation strengthening phases corresponding to the γ' phase (e.g., $Ni_3Al$ phase) of the $L1_2$ type structure in the Ni-based alloy materials. However, the $Co_3Ti$ phase and the $Co_3Ta$ phase have a lattice constant mismatch of 1% or more to the γ phase as a matrix phase, and are disadvantageous in the viewpoint of the creep characteristics. On the other hand, the $Co_3(Al,W)$ phase has a mismatch with the γ phase of about 0.5% or less, and thus can be a suitable precipitation strengthening phase. In the present invention, the $Co_3(Al,W)$ phase and its solid solution phase (a phase in which a part of the A and B sites of the $A_3B$ type compound are substituted with other elements) are finely dispersedly precipitated to enhance the mechanical characteristics.

On the other hand, it is known that in the Co-based alloy materials, when an alloy composition and/or a manufacturing process deviate from a suitable range, undesired phases are prone to generate/precipitate. And if such undesired phases become coarse, the mechanical properties of the Co-based alloy materials are greatly degraded.

The inventors studied intensively a means for suppressing precipitation and coarsening of the undesired phases for the purpose of obtaining mechanical properties equal to or higher than those of the conventional ones and suppressing a decrease in the manufacturing yield as compared with the conventional ones. As a result, the inventors found that although complete prevention of precipitating an undesired phase is difficult, the precipitation of the undesired phase can be finely dispersed by rapidly solidifying the melt of the alloy material, and thus the negative influence of the undesired phase can be restrained. The present invention has been made based on these findings.

Preferred embodiments of the present invention will be hereinafter described with reference to the accompanying drawings. However, the invention is not limited to the specific embodiments described below, and various combinations with known art and modifications based on known art are possible without departing from the scope of the invention. For example, the applied articles and their use based on the invention are not limited to the following descriptions.

[Method for Manufacturing Co-Based Alloy Product]

FIG. 1 is a flow diagram showing an exemplary process of a method for manufacturing a Co-based alloy product according to an embodiment of the invention. The method for manufacturing a Co-based alloy product of the invention roughly includes: an alloy powder preparation step S1 of preparing a Co-based alloy powder; an additive manufacturing step S2 of forming an additively manufactured article with a desired shape using the prepared Co based alloy powder; and an aging treatment step S3 of subjecting the additively manufactured article to an aging heat treatment to precipitate precipitation-strengthening phase grains with a desired amount in matrix phase crystal grains.

The alloy powder obtained by the step S1 is one aspect of a Co-based alloy material according to the invention, and the aging-treated article obtained by the step S3 is one aspect of a Co-based alloy product according to the invention.

As necessary, the aging-treated article obtained by the step S3 may be subjected to a surface treatment step S4 of forming a thermal barrier coating (TBC) and/or finishing a surface. This step S4 are not essential, but it is preferable to be performed based on considerations of a shape and a usage environment of the Co-based alloy product. The aging-treated article obtained through the step S4 is another aspect of a Co-based alloy product according to the invention.

Each step will be hereinafter described in more detail.

(Alloy Powder Preparation Step)

The alloy powder preparation step S1 is a step of preparing a Co-based alloy powder having a predetermined chemical composition. As a method and technique for preparing the Co-based alloy powder, basically any conventional method and technique may be used. For example, a master ingot manufacturing substep S1a of manufacturing a master ingot by mixing, melting, and casting the raw materials such that the ingot has a desired chemical composition and an atomization substep S1b of forming the alloy powder from the master ingot may be performed.

It is preferable to perform control of the O content in the alloy chemical composition in the atomization substep S1b. As an atomization method, any conventional method and technique may be used, except for controlling the O content in the Co-based alloy material. For example, when controlling the O content, gas atomizing or centrifugal force atomizing while controlling the amount of oxygen ($O_2$ partial pressure) in the atomization atmosphere may be preferably used. By the substep S1b, the alloy powder comprising substantially spherical particles can be obtained.

For ease of handling and ease of filling an alloy powder bed in the following additive manufacturing step S2, the particle size of the alloy powder is preferably 0.3 to 90 μm, more preferably 1 to 70 μm, and even more preferably 5 to 50 μm. When the particle size of the alloy powder is less than 0.3 μm, fluidity of the alloy powder decreases in the following step S2 (i.e. formability of the alloy powder bed decreases), which causes deterioration of shape accuracy of the additively manufactured article. In contrast, when the particle size of the alloy powder is over 90 μm, controlling local-melting and rapid-solidification of the alloy powder bed in the following step S2 becomes difficult, which leads to insufficient melting of the alloy powder and an increase in the surface roughness of the additively manufactured article.

In view of the above, an alloy powder classification substep S1c is preferably performed to regulate the alloy powder particle size to 0.3 μm or more and 90 μm or less. In the invention, when the particle size distribution of the obtained alloy powder is measured by using a laser diffraction/scattering type particle size distribution measuring apparatus and observed to fall within the desired range, it is assumed that the substep S1c has been performed.

Meanwhile, the particle size range of 0.3 to 90 μm in the invention is defined as that an amount of 90% by mass or more of the alloy powder is in the range of particle size of 0.3 μm or more and 90 μm or less. Furthermore, in the invention, when a metal powder-fluidity measurement (hole flow testing) in accordance with JIS Z 2502: 2012 is performed on 50 g of the powder classified with a particle size of 15 μm or more and 45 μm or less, it is preferable that the fluidity (a time required to flow out through a predetermined orifice) is 15 s or more and 30 s or less.

The alloy powder prepared in the step S1 contains more O component (controlled to contain more O component) as the alloy composition than the conventional Co-based alloy material. Thereby, it can be considered that in the Co-based alloy material of the invention, at the time the alloy melt solidifies into powder particles, the contained O atom combines with the metal atom of the alloy to locally form a very small oxide. Then, heterogeneous interfaces due to the oxide formation are likely to become a starting point of solidification of the alloy melt (nucleation site of the γ phase crystal). As a result, each particle of the alloy powder basically becomes a polycrystalline body of the γ phase fine crystals, and an average crystal grain size of the γ phase fine crystals becomes about 5 to 50 μm. However, the invention does not deny that particles made of single crystals of γ phase are mixed in the alloy powder.

(Chemical Composition of Co-Based Alloy Material)

Next, the chemical composition of Co-based alloy material will be described. A Co-based alloy material of the present invention has a chemical composition including: Al of 0.1 mass % or more and 10 mass % or less; W of 3 mass % or more and 45 mass % or less, the total content of the Al and the W being 50 mass % or less; O of 0.007 mass % or more and 0.05 mass % or less; and the balance being Co and impurities. The chemical composition may further include: E1 component of 0.001 mass % or more and 2 mass % or less; and/or E2 component of 0.1 mass % or more and 50 mass % or less. The E1 component consists of at least one selected from B, C, Y, La and mischmetal. The E2 component consists of at least one selected from Cr, Fe, Ni, Mo, Ru, Re, Ir, Ti, Zr, Hf, V, Nb and Ta.

By the above chemical composition, in the final Co-based alloy product (an aging-treated article), the γ' phase grains ($Co_3(Al,W)$ phase and solid solution phase thereof) having an $L1_2$ type structure as a precipitation strengthening phase can be finely dispersively precipitated in the γ phase crystal grains as a matrix phase of the product in a range of 40 volume % or more and 85 volume % or less. Meanwhile, the solid solution phase of $Co_3(Al,W)$ can be expressed as $(Co,X)_3(Al,W,Z)$. The Cr, Fe, Ru, Re and/or Ir can be in X. The Mo, Ti, Zr, Hf, V, Nb and/or Ta can be in Z. The Ni can be in X and Z.

Al: 0.1 Mass % or More and 10 Mass % or Less

The Al is an essential component of the γ' phase, which is a precipitation strengthening phase, and contributes to the improvement of oxidation resistance. The content of Al is preferably 0.1 mass % or more and 10 mass % or less, more preferably 0.5 mass % or more and 8 mass % or less, and further preferably 2 mass % or more and 5 mass % or less. When the Al content is less than 0.1 mass %, the precipitation amount of the γ' phase becomes insufficient and does not contribute to the precipitation strengthening. In contrast, when the Al content exceeds 10 mass %, it promotes formation of the hard and brittle undesired phases.

W: 3 Mass % or More and 45 Mass % or Less

The W is an essential component of the γ' phase and has an effect of strengthening the γ phase by solid solution. The content of W is preferably 3 mass % or more and 45 mass % or less, more preferably 4.5 mass % or more and 30 mass % or less, and further preferably 7 mass % or more and 25 mass % or less. When the W content is less than 3 mass %, the precipitation amount of the γ' phase becomes insufficient and does not contribute to the precipitation strengthening. In contrast, when the W content exceeds 45 mass %, it promotes formation of the hard and brittle undesired phases.

Total Content of Al and W: Less than 50 Mass %

The total content of the Al and the W is preferably less than 50 mass %, more preferably 40 mass % or less, and further preferably 30 mass % or less. When the total content of the Al and the W exceeds 50 mass %, it promotes formation of the hard and brittle undesired phases.

O: 0.007 Mass % or More and 0.05 Mass % or Less

The O is usually treated as an impurity component. However, in the Co-based alloy material of the present invention, the O is an essential component to control microstructures (e.g., formation of segregation cells and suppression of excess coarsening of the γ phase crystal grains, both being described later). The content of O is preferably 0.007 mass % (70 ppm) or more and 0.05 mass % (500 ppm) or less, more preferably 0.01 mass % or more and 0.04 mass % or less, and further preferably 0.015 mass % or more and 0.03 mass % or less. When the O content is less than 0.007 mass %, it becomes difficult to obtain the desired microstructure. In contrast, when the O content exceeds 0.05 mass %, coarse grains of an oxide of a cationic component (e.g., Al oxide) are formed, which causes deterioration of the mechanical properties.

E1 Component: 2 Mass % or Less

The E1 component is composed of one or more selected from B, C, Y, La and mischmetal, and is an optional component that can be added in a total range of 0.001 mass % or more and 2 mass % or less. The individual E1 components will be described.

B: 1 Mass % or Less

The B is a component that contributes to improvement of the bondability between crystal grain boundaries (so-called grain boundary strengthening), and contributes to improvement of the high temperature strength. Although the B is not an essential component, when it is contained in the alloy material, the content of B is preferably 0.001 mass % or more and 1 mass % or less, and more preferably 0.005 mass % or more and 0.5 mass % or less. When the B content exceeds 1 mass %, cracking is prone to occur during formation of the additively manufactured article.

C: 2 Mass % or Less

The C is a component that contributes to the strengthening of grain boundaries like the B component, and when fine particles of MC-type carbides (M is a transition metal and C is carbon) are generated and dispersively precipitated, they contribute to improvement of the mechanical strength. Although the C is not an essential component, when it is contained in the alloy material, the content of C is preferably 0.001 mass % or more and 2 mass % or less, more preferably 0.01 mass % or more and 1 mass % or less, and further preferably 0.05 mass % or more and 0.25 mass % or less. When the C content exceeds 2 mass %, carbides other than the MC-type carbides are precipitate excessively and/or the alloy material becomes excessively hardened, so that the toughness of the alloy material is deteriorated.

Y, La, and Mischmetal: Each 1 Mass % or Less

Each of the Y, the La and the mischmetal is an effective component for improving oxidation resistance. Although each the Y, La and mischmetal is not an essential component, when it is contained in the alloy material, the content of each component is preferably 0.01 mass % or more and 1 mass % or less, and more preferably 0.05 mass % or more and 0.5 mass % or less. When the content of each component exceeds 1 mass %, stability of the microstructure may be adversely affected.

E2 Component: 50 Mass % or Less

The E2 component is composed of one or more selected from Cr, Fe, Ni, Mo, Ru, Re, Ir, Ti, Zr, Hf, V, Nb, and Ta, and is an optional component that can be added in a total range of 0.1 mass % or more and 50 mass % or less. The individual E2 components will be described.

The E2 component is a component that can be dissolved in both the γ phase and the γ' phase. The partition coefficient of the x element in the γ' phase with respect to in the γ phase is expressed by an equation "$K_x^{\gamma'/\gamma} = C_x^{\gamma'}/C_x^{\gamma}$" (here, $C_x^{\gamma'}$:

atomic % concentration of the x element in the γ' phase, and $C_x^\gamma$: atomic % concentration of the x element in the γ phase). "Partition coefficient ≥1" means that the x element is a stabilizing element of the γ' phase, but "partition coefficient <1" means that the x element is a stabilizing element of the γ phase. For example, each of the Mo, the Ti, the V, the Nb, and the Ta is a component showing "partition coefficient ≥1" and contributes to stabilization of the γ' phase.

Cr: 20 Mass % or Less

The Cr is a component that shows "partition coefficient <1", forms an oxide layer (e.g., $Cr_2O_3$) on a surface of the alloy product, and contributes to improving corrosion resistance and oxidation resistance. Although the Cr is not an essential component, when it is contained in the alloy material, the content of Cr is preferably 1 mass % or more and 20 mass % or less, more preferably 3 mass % or more and 15 mass % or less, and further preferably 6 mass % or more and 10 mass % or less. When the Cr content exceeds 20 mass %, it promotes formation/growth of σ (sigma) phase that is a kind of undesired phases, so that the mechanical properties such as toughness, ductility and strength of the alloy material are deteriorated.

Fe: 10 Mass % or Less

The Fe is a component that contributes to improvement of workability/processability of the alloy material by substituting with the Co component. Although the Fe is not an essential component, when it is contained in the alloy material, the content of Fe is preferably 1 mass % or more and 10 mass % or less, and more preferably 2 mass % or more and 5 mass % or less. When the Fe content exceeds 10 mass %, it causes destabilization of the microstructure at high temperatures.

Ni: 50 Mass % or Less

The Ni is a component that improves the high temperature stability of the γ' phase by substituting with the Co, Al and W constituting the γ' phase, and contributes to improvement of the heat resistance and/or the corrosion resistance of the alloy material. Although the Ni is not an essential component, when it is contained in the alloy material, the content of Ni is preferably 1 mass % or more and 50 mass % or less, more preferably 5 mass % or more and 40 mass % or less, and further preferably 10 mass % or more and 35 mass % or less. When the Ni content exceeds 50 mass %, the wear resistance and the resistance to local stress, which are the advantages of Co-based alloy materials, decrease.

Mo: 15 Mass % or Less

The Mo is a component that shows "partition coefficient ≥1", contributes to stabilization of the γ' phase, and has an effect of strengthening the γ phase by solid solution. Although the Mo is not an essential component, when it is contained in the alloy material, the content of Mo is preferably 1 mass % or more and 15 mass % or less, and more preferably 2 mass % or more and 10 mass % or less. When the Mo content exceeds 15 mass %, it promotes formation/growth of the o phase so that the mechanical properties such as toughness, ductility and strength of the alloy material are deteriorated.

Ru and Re: Each 10 Mass % or Less

Each of the Ru and the Re is an effective component for improving the oxidation resistance. Although each the Ru and Re is not an essential component, when it is contained in the alloy material, the content of each component is preferably 0.5 mass % or more and 10 mass % or less, and more preferably 1 mass % or more and 5 mass % or less. When the content of each component exceeds 10 mass %, it promotes formation of the undesired phases.

Ir: 50 Mass % or Less

The Ir is a component that easily substitutes the Co in the γ' phase and contributes to improvement of the corrosion resistance and the oxidation resistance. Although the Ir is not an essential component, when it is contained in the alloy material, the content of Ir component is preferably 1 mass % or more and 50 mass % or less, and more preferably 5 mass % or more and 40 mass % or less. When the Ir content exceeds 50 mass %, it promotes formation of the undesired phases.

Ti, Zr, Hf, and V: Each 10 Mass % or Less;
Nb and Ta: Each 20 Mass % or Less

Each of the Ti, the Zr, the Hf, the V, the Nb, and the Ta is a component that shows "partition coefficient ≥1", contributes to stabilization of the γ' phase, and has an effect of improvement of the mechanical properties. Although each the Ti, Zr, Hf, V, Nb, and Ta is not an essential component, when the Ti is contained in the alloy material, the content of Ti is preferably 0.5 mass % or more and 10 mass % or less, and more preferably 1 mass % or more and 5 mass % or less. When the Zr is contained in the alloy material, the Zr content is preferably 1 mass % or more and 10 mass % or less, and more preferably 2 mass % or more and 7 mass % or less. When the Hf is contained in the alloy material, the Hf content is preferably 1 mass % or more and 10 mass % or less, and more preferably 2 mass % or more and 7 mass % or less. When the V is contained in the alloy material, the V content is preferably 0.5 mass % or more and 10 mass % or less, and more preferably 1 mass % or more and 5 mass % or less. When the Nb is contained in the alloy material, the Nb content is preferably 1 mass % or more and 20 mass % or less, more preferably 2 mass % or more and 15 mass % or less, and further preferably 3 mass % or more and 8 mass % or less. When the Ta is contained in the alloy material, the Ta content is preferably 1 mass % or more and 20 mass % or less, more preferably 2 mass % or more and 15 mass % or less, and further preferably 3 mass % or more and 8 mass % or less. Because the Ta has a higher effect of stabilizing the γ' phase than other components, it is particularly preferable to contain the Ta.

(Microstructure of Co-Based Alloy Powder)

Figure 2:
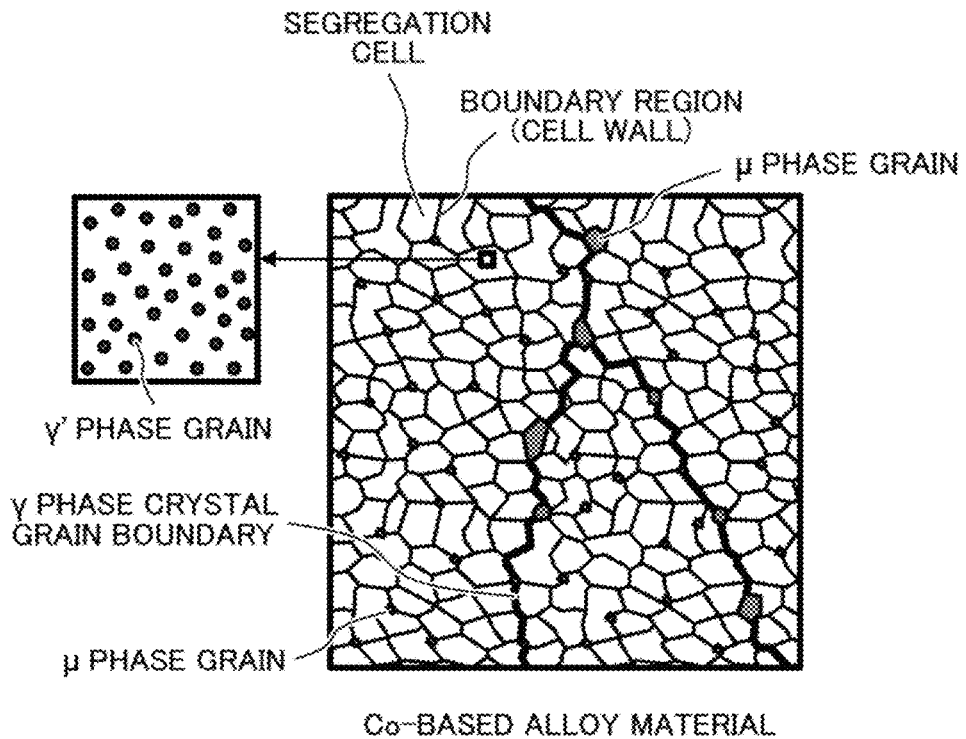
FIG. 2 is a schematic drawing showing an exemplary microstructure of a Co-based alloy material obtained by a alloy powder preparation step.

FIG. 2 is a schematic drawing showing an exemplary microstructure of a Co-based alloy material obtained by the alloy powder preparation step S1. The schematic drawing of FIG. 2 shows a cross sectional view of an alloy powder particle observed with a scanning electron microscope (SEM). Based on the microstructure observation, it is confirmed that the alloy powder particles are composed of polycrystals of γ phase microcrystals with an average crystal size of 5 μm or more and 50 μm or less, and microcells with an average size of 0.15 μm or more and 1.5 μm or less are formed in the microcrystals of the polycrystalline powder particles.

Meanwhile, it has been confirmed that there is a difference in brightness between inside of the microcells and boundary regions between the microcells (the outer peripheral region of the microcell, the region such as the cell wall) in the backscattered electron image of the SEM. This means that there is a difference between the average composition inside the microcell and the average composition of the boundary regions (in other words, a certain component segregates in the boundary regions and another component segregates inside the microcell). Such a microcell in which a certain component of the alloy material segregates inside the microcell or in the boundary regions thereof is referred to as a "segregation cell" in the present invention.

Furthermore, from the microstructure observation, it has been confirmed that the γ' phase grains (grains based on Co$_3$(Al,W)) with a grain size of 0.01 μm or more and 0.5 μm or less are dispersively precipitated in the segregation cells, and the μ phase grains (grains based on Co$_3$W$_2$) with a grain size of 0.005 μm or more and 2 μm or less are dispersively precipitated on both the boundary regions of the segregation cells and grain boundaries of the γ phase microcrystals.

When a precipitation amount of the γ' phase grains was calculated from the obtained electron microscopy image by image analysis using the image processing software (ImageJ), the precipitation amount of γ' phase grains was less than 40 volume %, which was less than the precipitation amount being estimated from the composition. It can be considered that this is due to the facts that the alloy powder particles are formed by rapid solidification and that the components constituting the γ' phase are segregated on the boundary regions of the segregation cells.

(Additive Manufacturing Step)

The additive manufacturing step S2 is a step of forming an additively manufactured article with a desired shape by an additive manufacturing method using the Co-based alloy powder prepared in the step S1. As the additive manufacturing method, selective laser melting (SLM) is preferable. Specifically, this step comprises alternate repetition of an alloy powder bed preparation substep S2a and a laser melting solidification substep S2b. In the substep S2a, the Co-based alloy powder is laid such that it forms an alloy powder bed having a predetermined thickness, and in the substep S2b, a predetermined region of the alloy powder bed is irradiated with a laser beam to locally melt and rapidly solidify the Co-based alloy powder in the region.

(Microstructure of Additively Manufactured Article)

The microstructure of the additively manufactured article obtained by this step S2 was observed using SEM and a scanning transmission electron microscope-energy dispersive X-ray spectroscopy (STEM-EDX). Although not shown by a figure, almost the same microstructure as in FIG. 1 was observed. This result is considered because additive manufacturing in the SLM method conducts local melting and rapid solidification of the alloy powder bed.

In the present invention, to obtain a final Co-based alloy product having a desired microstructure, there is controlled the microstructure of the additively manufactured article being a precursor of the final product. Furthermore, to control the microstructure of the additively manufactured article, there is controlled the chemical composition and the microstructure of the alloy powder in the step S1.

(Aging Treatment Step)

The aging treatment step S3 is a step of subjecting the additively manufactured article obtained in the step S2 to an aging treatment for precipitating the γ' phase grains with a desired amount in the γ phase crystal grains. The aging treatment is preferably performed at in a temperature range of 500° C. or more and less than 1100° C., more preferably of 500° C. or more and 1000° C. or less, and further preferably of 500° C. or more and 900° C. or less.

Within the above temperature range, the aging treatment may be a one-stage heat treatment performed at one kind temperature or a multi-stage heat treatment performed at a plurality of temperature. For example, it is preferable that after performing the first aging treatment in a temperature range of 500° C. or higher and 700° C. or lower, the second aging treatment is performed in a temperature range of 600° C. or higher and 800° C. or lower and at a temperature higher than the temperature of the first aging treatment. With respect to a holding duration of the aging treatment, it may be appropriately set in consideration of a heat capacity of an object to be heat-treated (the additively manufactured article). Through the step S3, a Co-based alloy product according to the invention is obtained.

(Microstructure of Co-Based Alloy Product)

Figure 3:
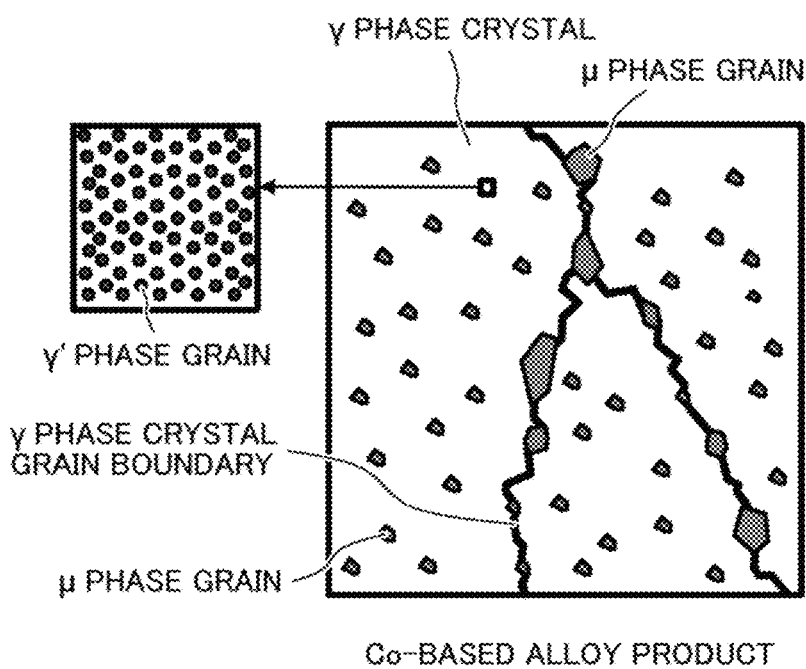
FIG. 3 is a schematic drawing showing an exemplary microstructure of a Co-based alloy product obtained by an aging treatment step.

FIG. 3 is a schematic drawing showing an exemplary microstructure of a Co-based alloy product obtained by the aging treatment step S3. Similar to FIG. 2, the schematic drawing of FIG. 3 shows a cross sectional view of an alloy product observed with SEM. Based on the microstructure observation, it is confirmed that the alloy product is composed of: polycrystals of the γ phase crystal grains with an average grain size of 10 μm or more and 100 μm or less; the γ' phase grains with a grain size of 0.01 μm or more and 1 μm or less being dispersively precipitated in the γ phase crystal grains; and the μ phase grains with a grain size of 0.005 μm or more and 20 μm or less being dispersively precipitated both within the γ phase crystal grains and on grain boundaries of the γ phase crystal grains. On the other hand, the boundary regions of the segregation cells as shown in FIG. 2 were not visible.

When the precipitation amount of γ' phase grains was calculated from the obtained electron microscopy image by image analysis using the software ImageJ, the precipitation amount of γ' phase grains was more than 40 volume %, which was congruent with the precipitation amount being estimated from the composition. It can be considered that as reasons for this result there is a complex relationship among phenomena during the aging heat treatment in the step S3: diffusion of the components located in the boundary regions of the segregation cells while extinguishing the boundary regions; growth of the γ phase crystal grains due to rearrangement of atoms (recrystallization of the γ phase); and suppression of growth of the μ phase grains due to lower temperature of the heat treatment than the solvus temperature of the γ' phase.

(Advantageous Effects of the Embodiments)

As described above, it can be said that a Co-based alloy product of the present invention exhibits the mechanical properties equivalent to those of the prior art because the γ' phase grains are finely dispersedly precipitated within the γ phase crystal grains. Also, it can be said that a method for manufacturing the Co-based alloy product of the invention has an effect in that the production yield is improved as compared with the conventional technique because the μ phase that decreases both the mechanical properties and the production yield is finely dispersed without coarsening.

[Co-Based Alloy Product]

Figure 4:
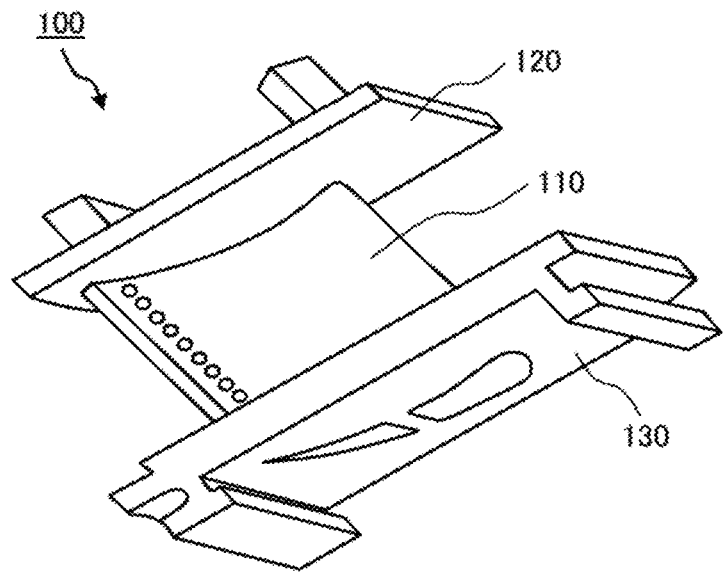
FIG. 4 shows an example of a Co-based alloy product according to an embodiment of the invention, and is a schematic drawing of a perspective view showing a turbine stator blade as a high temperature member.

FIG. 4 shows an example of a Co-based alloy product according to an embodiment of the invention, and is a schematic drawing of a perspective view showing a turbine stator blade as a high temperature member. The turbine stator blade 100 roughly includes an inner ring side end wall 120, an airfoil part 110, and an outer ring side end wall 130. Inside the airfoil part 110 is often formed a cooling structure. A Co-based alloy product of the invention may be used as a turbine rotor blade.

Figure 5:
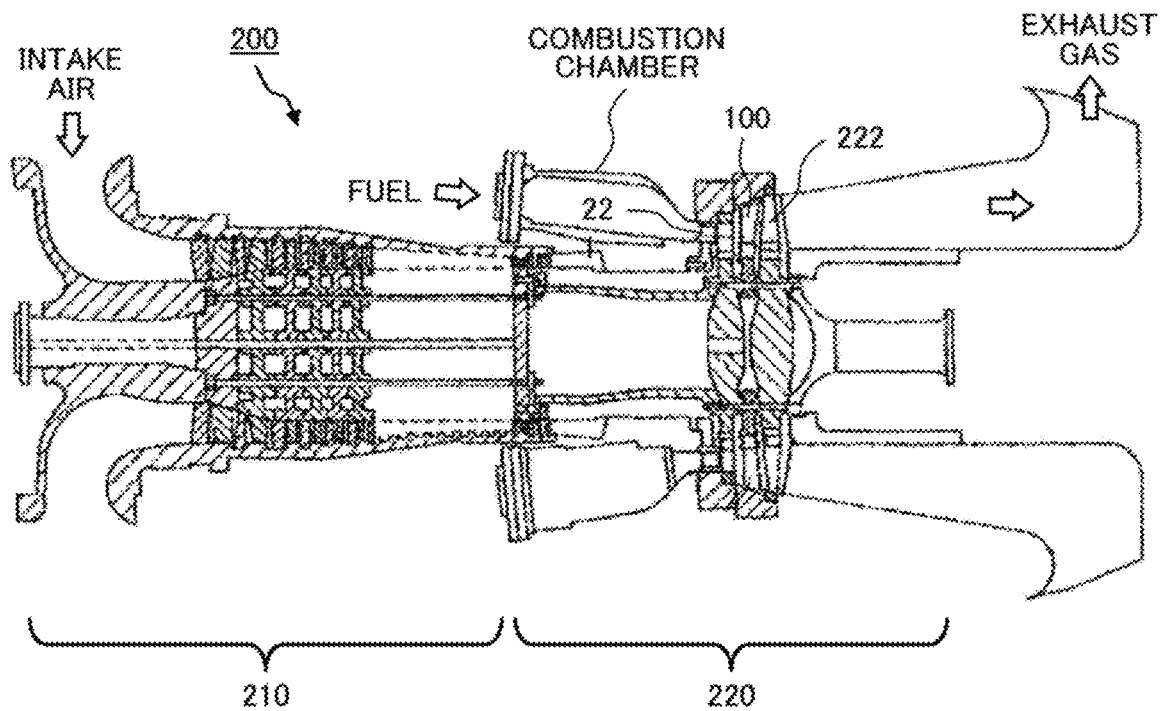
FIG. 5 is a schematic drawing of a cross-sectional view showing an exemplary gas turbine equipped with a Co-based alloy product according to an embodiment of the invention.

FIG. 5 is a schematic drawing of a cross-sectional view showing an exemplary gas turbine equipped with a Co-based alloy product according to an embodiment of the invention. The gas turbine 200 roughly includes a compression part 210 for compressing intake air and a turbine part 220 for blowing combustion gas of a fuel on turbine blades to obtain rotation power. The high temperature member of the invention can be preferably used as a turbine nozzle 221, the turbine stator blade 100 and/or the turbine rotor blade 222 inside the turbine part 220. The high temperature member according to the invention is not limited to gas turbine applications but may be used for other turbine applications (e.g. steam turbines) and component used under high temperature environment in other machines/apparatuses.

Figure 6:
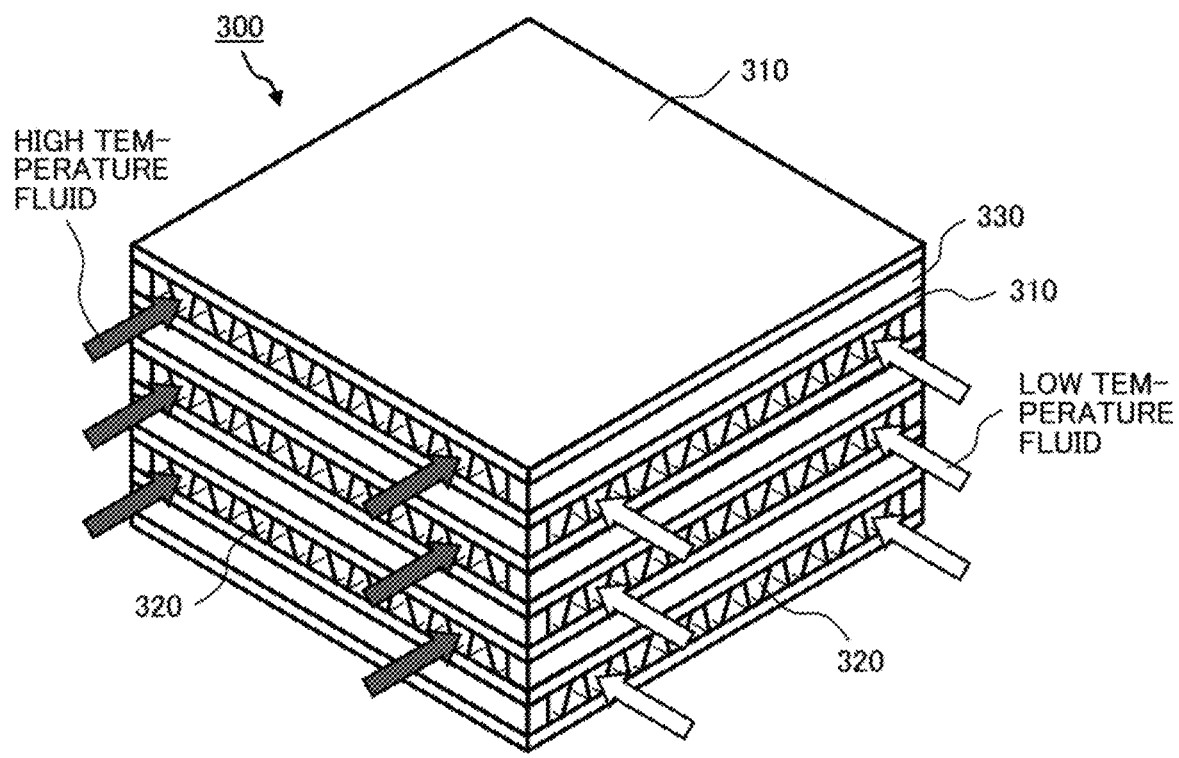
FIG. 6 shows another example of a Co-based alloy product according to an embodiment of the invention, and is a schematic drawing of a perspective view showing a heat exchanger as a high temperature member.

FIG. 6 shows another example of a Co-based alloy product according to an embodiment of the invention, and is a schematic drawing of a perspective view showing a heat exchanger as a high temperature member. The heat exchanger 300 is an example of a plate-fin type heat exchanger and has a basic structure in which a separation layer 310 and a fin layer 320 are alternatively stacked each other. Both ends in the width direction of flow channels in the fin layer 320 are sealed by a side bar portion 330. Heat exchanging between high temperature fluid and low temperature fluid can be done by flowing the high temperature fluid and the low temperature fluid alternately into adjacent fin layers 320.

The heat exchanger 300 of the invention is formed integrally without soldering joining or welding joining the conventional parts constituting a heat exchanger such as separation plates, corrugated fins and side bars. Consequently, the heat resistance and weight can be reduced compared with conventional heat exchangers. In addition, the heat transfer efficiency can be higher by forming an appropriate concavo-convex pattern on the surfaces of the flow channels and making the fluid into turbulence. Improving the heat transfer efficiency leads to downsizing of the heat exchanger.

Figure 7:
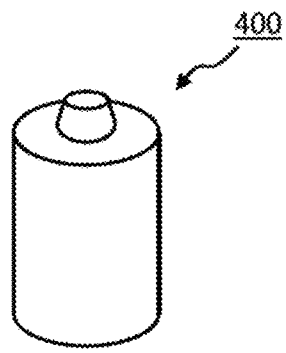
FIG. 7 shows another example of a Co-based alloy product according to an embodiment of the invention, and is a schematic drawing of a perspective view showing a tool for friction stir welding.

FIG. 7 shows another example of a Co-based alloy product according to an embodiment of the invention, and is a schematic drawing of a perspective view showing a tool for friction stir welding. The friction stir welding tool 400 can exhibit advantages such as superior heat resistance, high mechanical strength, high hardness, and superior wear resistance by using the Co-based alloy material of the invention.

Modification of Embodiment

Although the Co-based alloy product prepared by additive manufacturing has been described in the above embodiment, the present invention is not limited to the descriptions. As another example, an alloy product can be manufactured by a powder metallurgy method (e.g., hot isostatic pressing) using the alloy powder described before.

EXAMPLES

The present invention will be hereinafter described in more concrete with examples and comparative examples.

Experiment 1

(Preparation of Inventive Alloy Material IA-1 and Comparative Alloy Materials CA-1 to CA-4)

In the preparation of the inventive alloy material IA-1, first, raw materials of the Co-based alloy were mixed, melted and cast to prepare a master ingot (100 kg). Melting was carried out by a vacuum induction heating melting method. Next, the obtained master ingot was redissolved, and an alloy powder was prepared by a gas atomizing method while controlling the $O_2$ partial pressure in the atomizing atmosphere. The chemical composition of IA-1 consists of C: 0.1 mass %, O: 0.01 mass %, Al: 3.6 mass %, W: 21.5 mass %, Cr: 8 mass %, Ni: 27 mass %, Ta: 5.4 mass %, and the balance: Co and unavoidable impurities.

The particle size of the produced IA-1 powder was measured using a laser diffraction/scattering type particle size distribution measuring apparatus (SYNC, manufactured by MicrotracBEL Corp.). It was confirmed that the particle size was within a range of 0.3 μm or more and 90 μm or less. After that, a part of IA-1 powder was classified into a particle size within a range of 15 μm or more and 45 μm or less. The classified IA-1 powder 50 g was subjected to a hole flow testing in accordance with JIS Z 2502: 2012, thus it was confirmed that IA-1 powder had the fluidity within a range of 15 s or more and 30 s or less.

For the comparative alloy material CA-1, a master ingot was prepared in the same manner as in IA-1, and then a purified ingot controlled to have the O content of 0.002 mass % was remelted and recast. That is, the comparative alloy material CA-1 has the same composition as IA-1 except for the O content.

For the comparative alloy materials CA-2 to CA-4, commercially available Ni-based alloy materials for conventional casting (Mar M247 equivalent material, IN738 equivalent material, and IN939 equivalent material) were prepared. CA-1 is a material equivalent to "Mar M247", and its chemical composition consists of C: 0.16 mass %, B: 0.015 mass %, Al: 5.5 mass %, W: 10 mass %, Cr: 8.5 mass %, Co: 10 mass %, Mo: 0.6 mass %, Ti: 1 mass %, Zr: 0.04 mass %, Hf: 1.4 mass %, Ta: 3 mass %, and the balance: Ni and unavoidable impurities.

CA-2 is a material equivalent to "IN738", and its chemical composition consists of C: 0.1 mass %, B: 0.01 mass %, Al: 3.4 mass %, W: 2.6 mass %, Cr: 16 mass %, Co: 8.5 mass %, Mo: 1.8 mass %, Ti: 3.4 mass %, Zr: 0.06 mass %, Nb: 0.9 mass %, Ta: 1.8 mass %, and the balance: Ni and unavoidable impurities.

CA-3 is a material equivalent to "IN939", and its chemical composition consists of C: 0.15 mass %, B: 0.01 mass %, Al: 1.9 mass %, W: 2 mass %, Cr: 22.4 mass %, Co: 19 mass %, Ti: 3.7 mass %, Zr: 0.1 mass %, Nb: 1 mass %, Ta: 1.4 mass %, and the balance: Ni and unavoidable impurities.

Experiment 2

(Preparation of Inventive Alloy Product IP-1 and Comparative Alloy Products CP-1 to CP-4)

An additively manufactured article (8 mm in diameter×60 mm in length) was formed by the SLM process, using IA-1 prepared in Experiment 1. The thickness of alloy powder bed h and the output power of the laser beam P were set at 100 μm and 100 W, respectively. The local heat input P/S (unit: W×s/mm=J/mm) was controlled by varying the scanning speed (mm/s) of the laser beam S to control the average grain size of the γ phase crystal grains into a range of 10 μm or more and 100 μm or less. Controlling the amount of local heat input corresponds to controlling a cooling rate of the rapid solidification.

Next, the prepared additively manufactured article was subjected to the first aging treatment of holding at 650° C. for 24 hours and the second aging treatment of holding at 760° C. for 16 hours to fabricate the inventive alloy product IP-1.

Cast articles (8 mm in diameter×60 mm in length) were formed by the conventional casting process, using each of CA-1 to CA-4 prepared in Experiment 1. Similar to IP-1, the cast article made from CA-1 was subjected to the first aging treatment of holding at 650° C. for 24 hours and the second aging treatment of holding at 760° C. for 16 hours to fabricate the comparative alloy product CP-1. Regarding to the cast articles made from CA-2 to CA-4, appropriate solution-aging treatment was performed on each alloy material to fabricate each of comparative alloy products CP-2 to CP-4.

In each alloy material, a plurality of alloy product sample was prepared.

Experiment 3

(Microstructure Observation and Mechanical Properties Testing)

There were observed microstructures of the inventive alloy material IA-1, the additively manufactured article therefrom, the inventive alloy product IP-1, and the comparative alloy products CP-1 to CP-4.

As explained in FIG. 2, it is confirmed that each of IA-1 and the additively manufactured article therefrom is polycrystals of the γ phase microcrystals with an average crystal size of 5 μm or more and 50 μm or less, and that within the γ phase microcrystals, the microcells with an average size of 0.15 μm or more and 1.5 μm or less are formed.

Also, as explained in FIG. 3, it is confirmed that IP-1 is composed of: polycrystals of the γ phase crystal grains with an average grain size of 10 μm or more and 100 μm or less; the γ' phase grains with a grain size of 0.01 μm or more and fpm or less being dispersively precipitated in the γ phase crystal grains; and the μ phase grains with a grain size of 0.005 μm or more and 20 μm or less being dispersively precipitated both within the γ phase crystal grains and on grain boundaries of the γ phase crystal grains.

Figure 8:
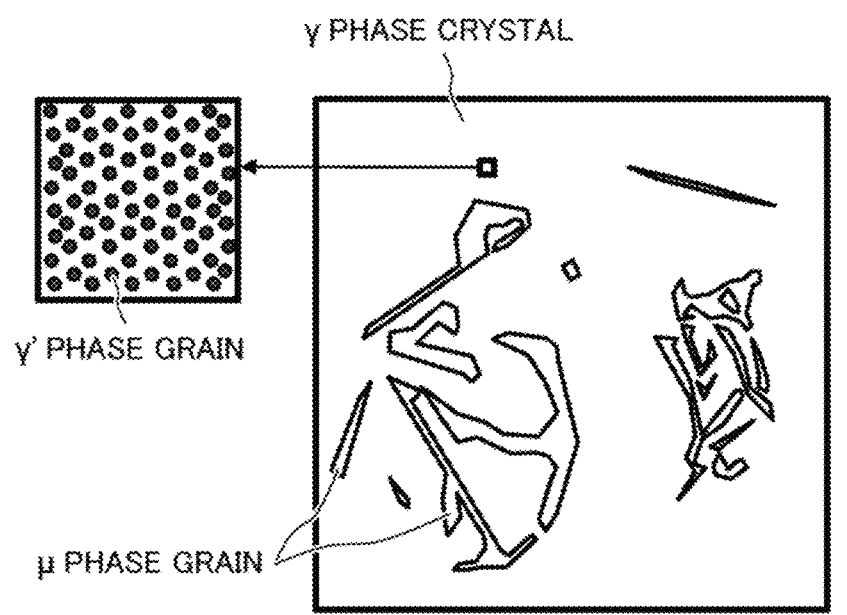
FIG. 8 is a schematic drawing showing an exemplary microstructure of comparative alloy product CP-1.

FIG. 8 is a schematic drawing showing an exemplary microstructure of the comparative alloy product CP-1. Similar to FIGS. 2 and 3, the schematic drawing of FIG. 8 shows a cross sectional view of the alloy product CP-1 observed with SEM. Based on the microstructure observation, it is confirmed that the alloy product CP-1 is composed of: polycrystals of the γ phase crystal grains with an average grain size of more than 100 μm; and the γ' phase grains with a grain size of 0.01 μm or more and 1 μm or less being dispersively precipitated in the γ phase crystal grains; but a large amount of coarse grains of the μ phase with a grain size of more than 20 μm being precipitated both within the γ phase crystal grains and on the grain boundaries of γ phase crystal grains.

As reasons for the above microstructure of FIG. 8, it can be considered as follows: for example, because the comparative alloy product CP-1 was prepared by the conventional casting, the solidification rate was relatively slow and thus the μ phase grains were easy to grow coarsely; and the chemical composition thereof includes less O content and thus the γ phase grains were also easy to grow coarsely.

Although not shown by a figure, it was confirmed that in CP-2 to CP-4, the microstructure as in the prior art was obtained for each material.

A high temperature fatigue testing was conducted to confirm the high temperature durability that is one of advantageous characteristics of Co-based alloys. As for the testing conditions, 0.5% strain was repeatedly loaded and unloaded in a temperature environment of 850° C., and the number of cycles until fracture was investigated. The results are shown in Table 1.

TABLE 1

High Temperature Fatigue Testing Results of Alloy Products IP-1 and CP-1 to CP-4.

| Alloy Product | Alloy Material | Testing Temperature (° C.) | Strain (%) | Number of Cycles until Fracture |
| --- | --- | --- | --- | --- |
| IP-1 | IA-1 | 850 | 0.5 | 829,940 |
| CP-1 | CA-1 | | | 9 |
| CP-2 | CA-2 | | | 3,238 |
| CP-3 | CA-3 | | | 3,040 |
| CP-4 | CA-4 | | | 2,369 |

As shown in Table 1, it is confirmed that the inventive alloy product IP-1 exhibits extremely superior high temperature fatigue characteristics as compared with the comparative alloy products CP-2 to CP-4 (conventional Ni-based superalloy cast articles). In contrast, the comparative alloy product CP-1 shows extremely inferior high temperature fatigue characteristics. As reasons for the inferior high temperature fatigue characteristics of CP-1, it can be considered as follows: for example, a large amount of the μ phase coarse grains with a grain size of more than 20 μm are precipitated both within the γ phase crystal grains and on the grain boundaries of γ phase crystal grains; and the average grain size of the γ phase crystal grains is over 100 μm.

Next, other samples of IP-1 were subjected to a tensile testing at a room temperature and a temperature of 800° C. The results are shown in Table 2.

TABLE 2

Tensile Testing Results of Alloy Product IP-1.

| Alloy Product | Alloy Material | Testing Temperature (° C.) | 0.2% Proof Stress (MPa) | Tensile Strength (MPa) |
| --- | --- | --- | --- | --- |
| IP-1 | IA-1 | Room Temperature | 1,135 | 1,600 |
| | | 800 | 905 | 1,101 |

As shown in Table 2, it is confirmed that the inventive alloy product IP-1 exhibits a sufficiently high mechanical strength equal to or higher than those of the prior arts.

As described above, from the results of microstructure observation and mechanical property testing, it has been confirmed that a Co-based alloy product and a method for manufacturing thereof according to the invention can achieve the mechanical properties equal to or higher than the conventional ones, and suppress decrease in the production yield even if the alloy product is manufactured in quantity at the industrial production level. Furthermore, it has been confirmed that a Co-based alloy material according to the invention is suitable for manufacturing the alloy product.

What is claimed is:

1. A Co-based alloy material, having a chemical composition comprising:
   Al of 0.1 mass % or more and 10 mass % or less;
   W of 3 mass % or more and 45 mass % or less, the total content of the Al and the W being 50 mass % or less;
   O of 0.007 mass % or more and 0.05 mass % or less; and
   the balance being Co and impurities,
   wherein in γ phase crystal grains as a matrix phase of the Co-based alloy material, segregation cells within an average size of 0.15 μm or more and 1.5 μm or less are formed, wherein in the segregation cells, γ' phase grains within a size of 0.01 μm or more and 0.5 μm or less including Co, Al and W are dispersively precipitated, and wherein on boundary regions of the segregation cells and grain boundaries of the γ phase crystal grains, μ phase grains within a size of 0.005 μm or more and 2 μm or less including Co and W are dispersively precipitated.

2. The Co-based alloy material according to claim 1, wherein:
the material is a powder comprising particles;
the particles have a size of 0.3 μm or more and 90 μm or less; and
the γ phase crystal grains constituting the powder particles have an average size of 50 μm or less.

3. The Co-based alloy material according to claim 1, wherein:
the material is a powder comprising particles;
the particles have a size of 0.3 μm or more and 90 μm or less in an amount of 90 mass % or more thereof; and
the γ phase crystal grains constituting the powder particles have an average size of 50 μm or less.

4. The Co-based alloy material according to claim 2, wherein
when a hole flow testing is performed in accordance with JIS Z 2502: 2012 for 50 g of the powder classified into a size range of 15 μm or more and 45 μm or less, fluidity of the powder classified is 15 s or more and 30 s or less.

5. The Co-based alloy material according to claim 3, wherein
when a hole flow testing is performed in accordance with JIS Z 2502: 2012 for 50 g of the powder classified into a size range of 15 μm or more and 45 μm or less, fluidity of the powder classified is 15 s or more and 30 s or less.

6. The Co-based alloy material according to claim 1, wherein the chemical composition further comprises:
E1 component that is at least one selected from B, C, Y, La and mischmetal, the total content of the E1 component being 0.001 mass % or more and 2 mass % or less; and
E2 component that is at least one selected from Cr, Fe, Ni, Mo, Ru, Re, Ir, Ti, Zr, Hf, V, Nb and Ta, the total content of the E2 component being 0.1 mass % or more and 50 mass % or less.

7. The Co-based alloy material according to claim 6, wherein the chemical composition consists of:
C of 0.05 mass % or more and 0.15 mass % or less;
O of 0.007 mass % or more and 0.05 mass % or less;
Al of 2 mass % or more and 5 mass % or less;
W of 7 mass % or more and 25 mass % or less;
Cr of 6 mass % or more and 10 mass % or less;
Ni of 20 mass % or more and 35 mass % or less;
Ta of 3 mass % or more and 8 mass % or less; and
the balance being Co and impurities.

\* \* \* \* \*